US00RE47962E

(19) United States
(12) Reissued Patent
White

(10) Patent Number: US RE47,962 E
(45) Date of Reissued Patent: Apr. 28, 2020

(54) OFFSET DISPLAY HOLDER

(71) Applicant: K-International, Inc., Waukegan, IL (US)

(72) Inventor: Michael J. White, Ripon, WI (US)

(73) Assignee: K-International, Inc., Waukegan, IL (US)

(21) Appl. No.: 29/604,422

(22) Filed: May 17, 2017

Related U.S. Patent Documents

Reissue of:
(64) Patent No.: Des. 749,404
Issued: Feb. 16, 2016
Appl. No.: 29/484,730
Filed: Mar. 12, 2014

(51) LOC (12) Cl. ..... 08-05
(52) U.S. Cl.
USPC ..... D8/380
(58) Field of Classification Search
USPC ..... D25/122, 123, 124, 125; D8/380, 349, D8/354, 381, 373; D6/702; D20/40, 42, D20/43

(Continued)

(56) References Cited

U.S. PATENT DOCUMENTS

D238,412 S * 1/1976 De Mars ..... D20/43
D322,634 S * 12/1991 Callas ..... D20/42

(Continued)

*Primary Examiner* — Philip S Hyder
(74) *Attorney, Agent, or Firm* — Schiff Hardin LLP

(57) CLAIM

The ornamental design of an offset display holder, as shown and described.

DESCRIPTION

FIG. 1 is a perspective view taken from the front, top, right side of the offset display holder showing my new design;
FIG. 2 is a top plan view of the offset display holder of FIG. 1;
FIG. 3 is a bottom plan view of the offset display holder of FIG. 1;
FIG. 4 is a front elevational view of the offset display holder of FIG. 1;
FIG. 5 is a back elevational view of the offset display holder of FIG. 1; and
FIG. 6 is a right side elevational view of the offset display holder of FIG. 1; [and,]
FIG. 7 is a left side elevational view of the offset display holder of FIG. 1[.];
*FIG. 8 is a perspective view taken from the front, top, right side of the offset display holder showing a second embodiment of my new design;*
*FIG. 9 is a top plan view of the offset display holder of FIG. 8;*
*FIG. 10 is a bottom plan view of the offset display holder of FIG. 8;*
*FIG. 11 is a front elevational view of the offset display holder of FIG. 8;*
*FIG. 12 is a back elevational view of the offset display holder of FIG. 8;*
*FIG. 13 a right side elevational view of the offset display holder of FIG. 8;*
*FIG. 14 is a left side elevational view of the offset display holder of FIG. 8; and,*
*FIG. 15 is an enlarged view of FIG. 13.*
Portions shown in broken lines depict environmental subject matter only and form no part of the claimed design.

1 Claim, 6 Drawing Sheets

Figure 1:
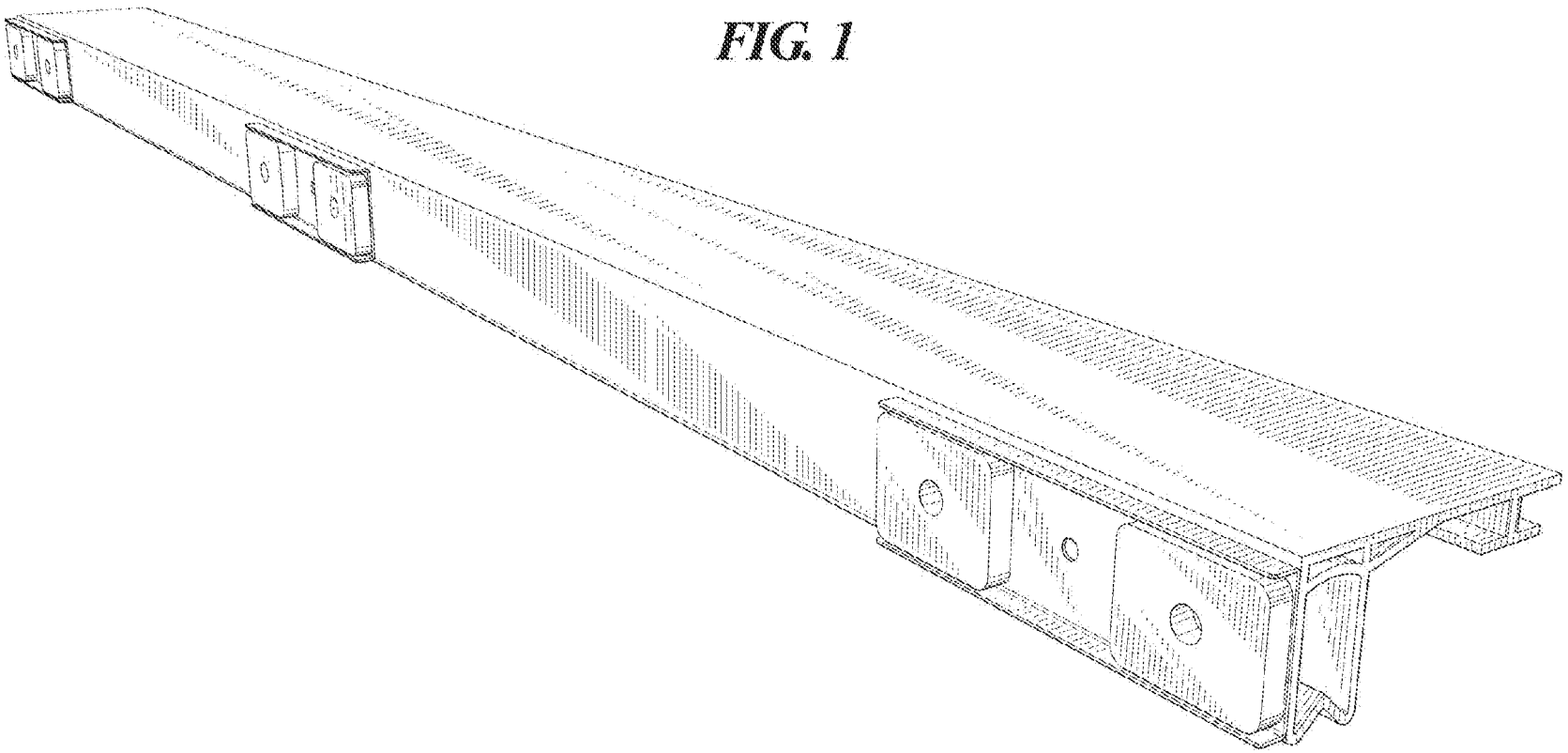
Figure 2:
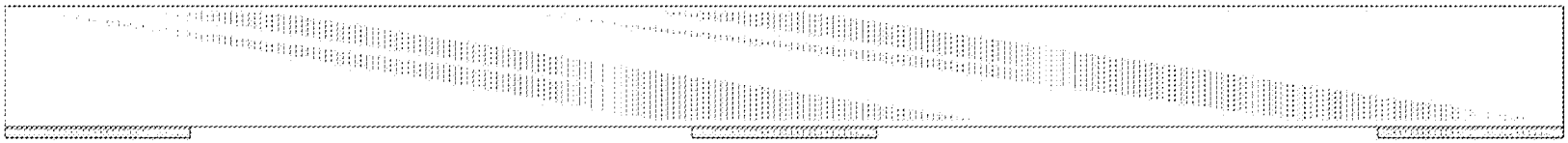
Figure 3:
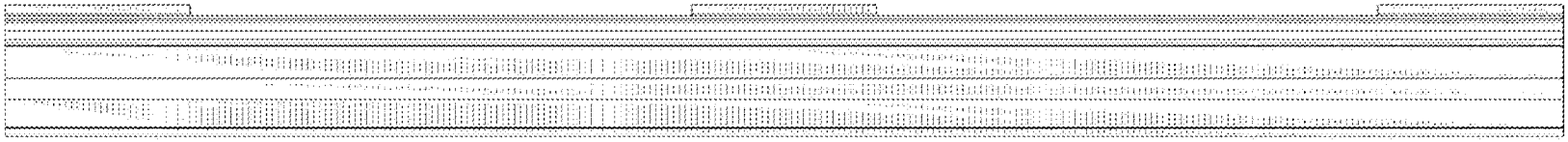
Figure 4:
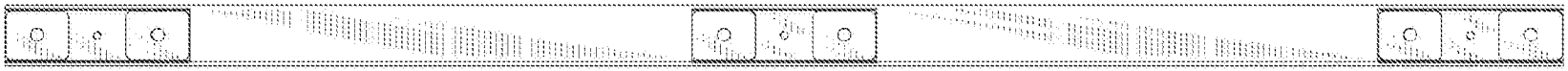
Figure 5:
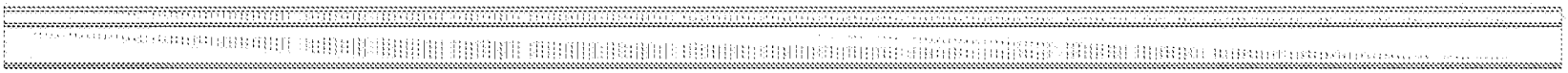
Figure 7:
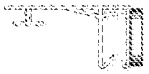
Figure 6:
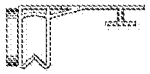

Matter enclosed in heavy brackets [ ] appears in the original patent but forms no part of this reissue; matter printed in italics indicates the additions made by reissue.

(58) Field of Classification Search
CPC ..... G09F 7/04; G09F 1/10; G09F 1/12; G09F 19/00; G09F 5/00; G09F 1/08; G09F 3/08
See application file for complete search history.

(56) References Cited

U.S. PATENT DOCUMENTS

| | | | | | |
|---|---|---|---|---|---|
| D372,939 | S | * | 8/1996 | Callas | D20/43 |
| D381,695 | S | * | 7/1997 | Lewis | D20/40 |
| D386,531 | S | * | 11/1997 | Callas | D20/40 |
| D389,259 | S | * | 1/1998 | Tichy et al. | D20/43 |
| D389,526 | S | * | 1/1998 | Callas | D20/43 |
| D423,592 | S | * | 4/2000 | Wamsley | D20/42 |
| D496,248 | S | * | 9/2004 | Liebendorfer | D8/354 |
| D511,548 | S | * | 11/2005 | Wamsley | D20/43 |
| D537,326 | S | * | 2/2007 | Wolff et al. | D8/381 |
| D669,135 | S | * | 10/2012 | Garfinkle | D20/43 |
| D673,223 | S | * | 12/2012 | White | D20/43 |

* cited by examiner

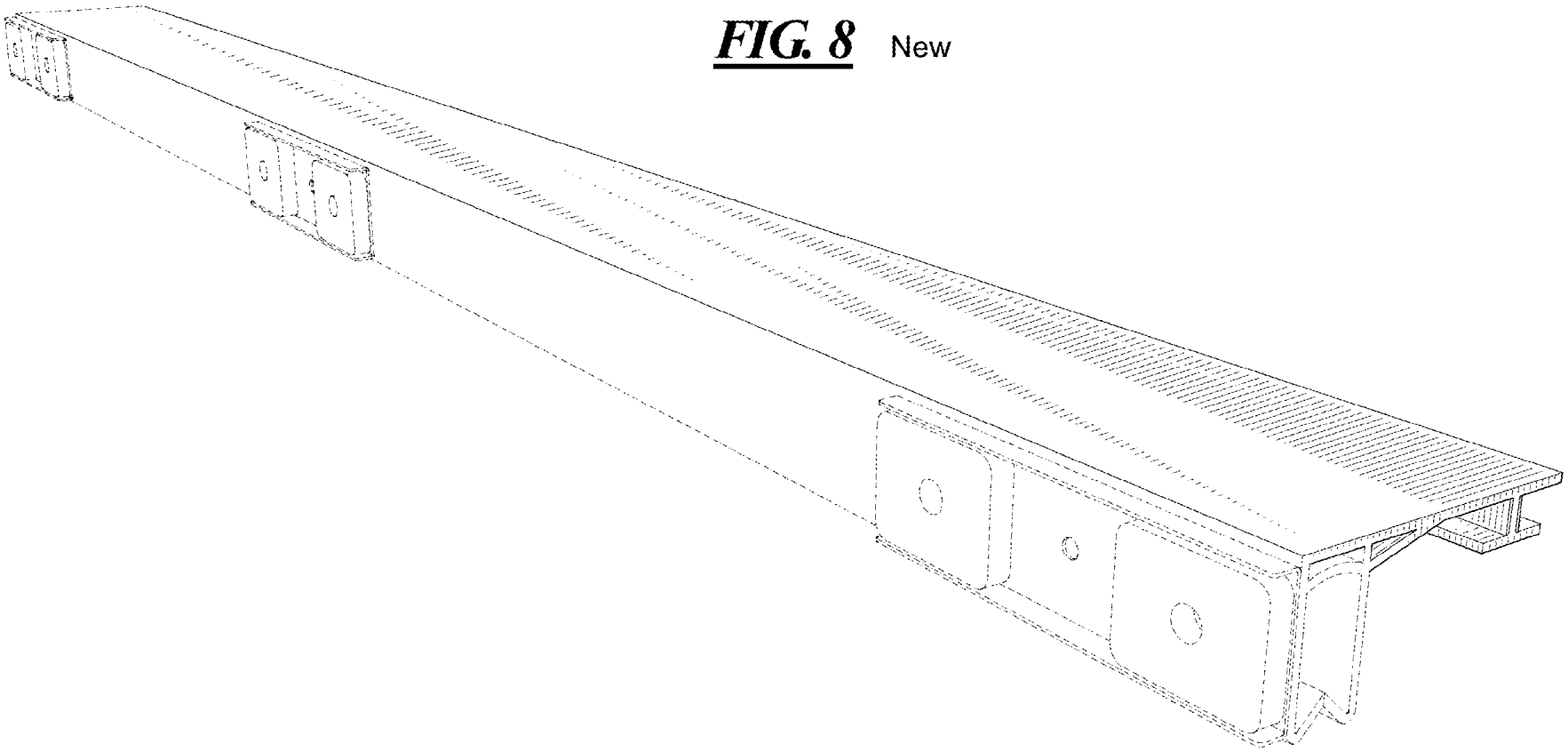
FIG. 8 New

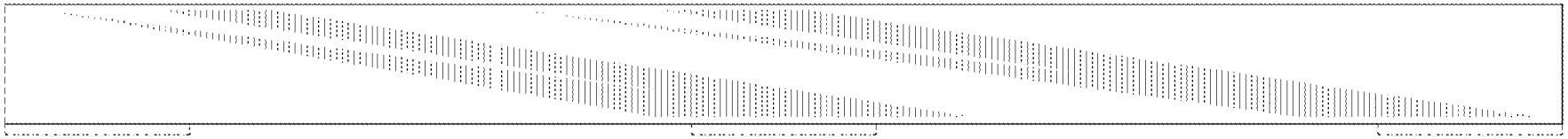
FIG. 9 New
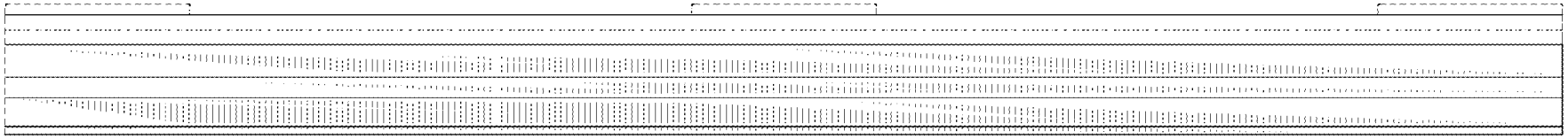
FIG. 10 New

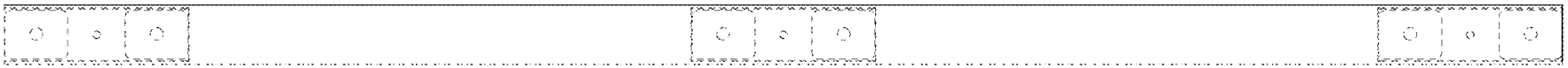
FIG. 11 New
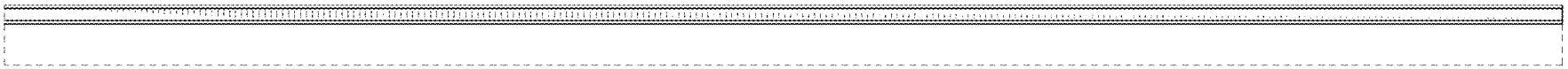
FIG. 12 New
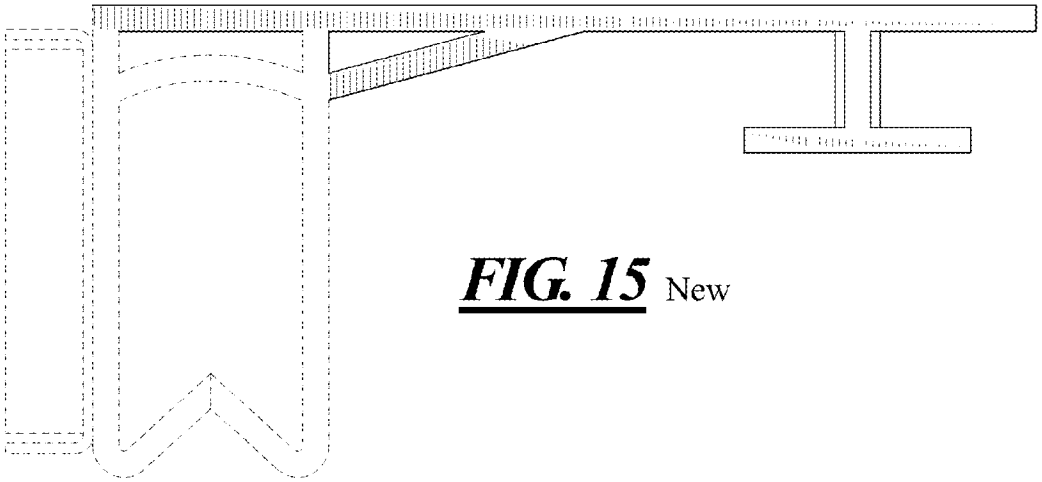
FIG. 15 New
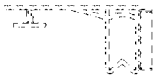
FIG. 14 New
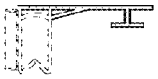
FIG. 13 New